Nov. 22, 1966   L. L. ANDERSON   3,287,051
MAGNETIC CATCH
Filed Aug. 10, 1964   6 Sheets-Sheet 1
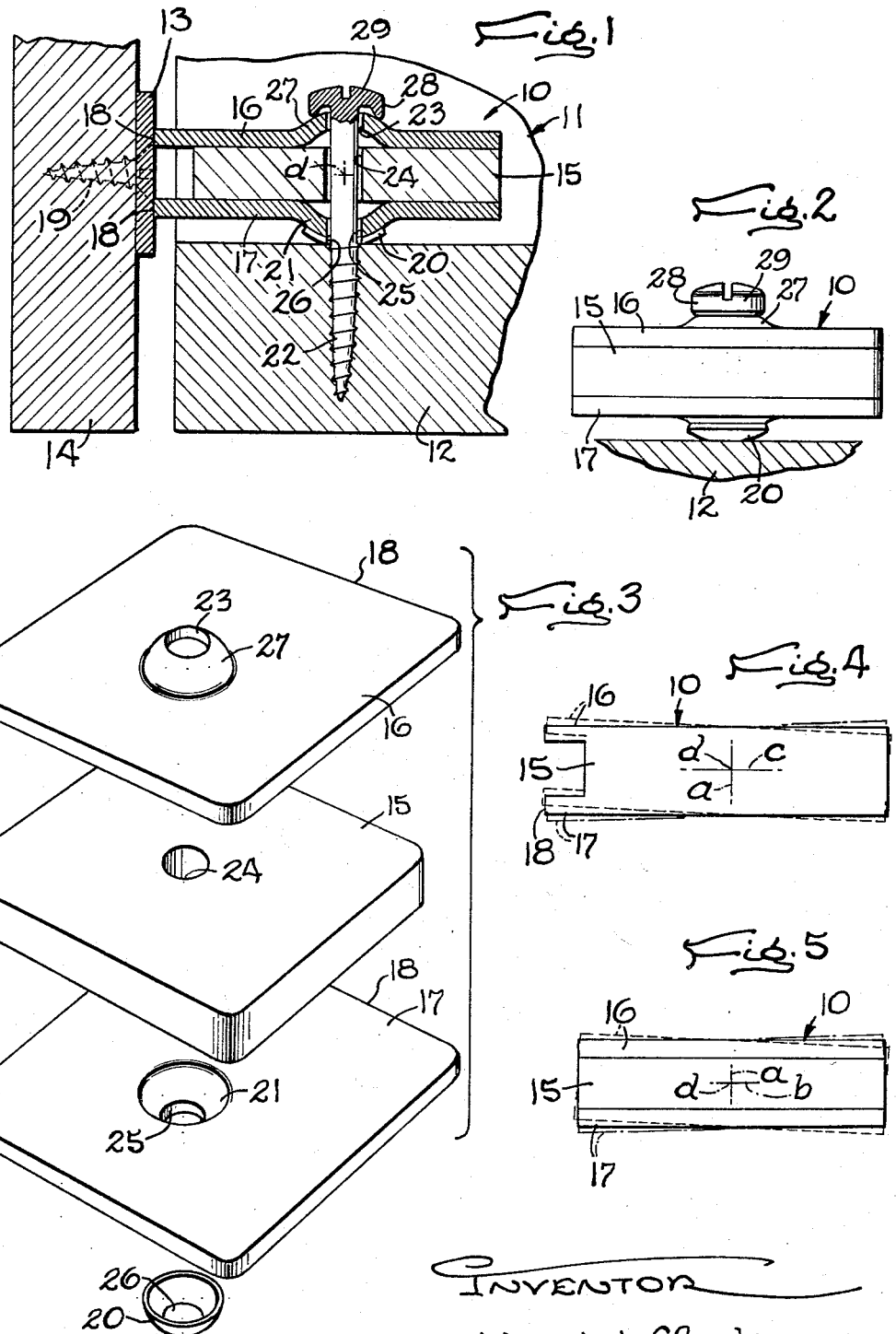
INVENTOR
Lloyd L. Anderson
by Wolfe, Hubbard, Voit & Osann
ATTORNEYS Nov. 22, 1966  L. L. ANDERSON  3,287,051
MAGNETIC CATCH
Filed Aug. 10, 1964  6 Sheets-Sheet 2
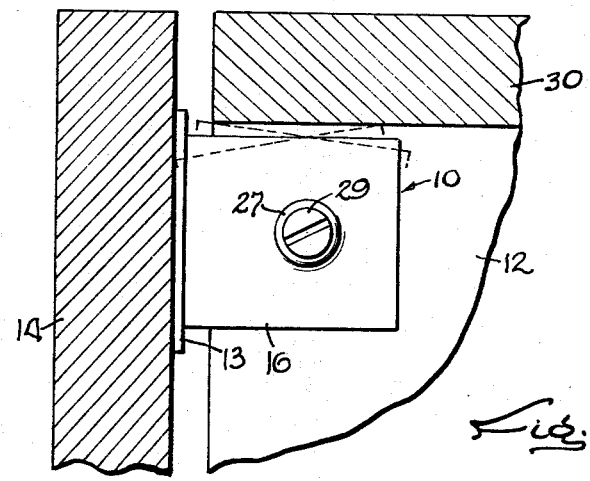
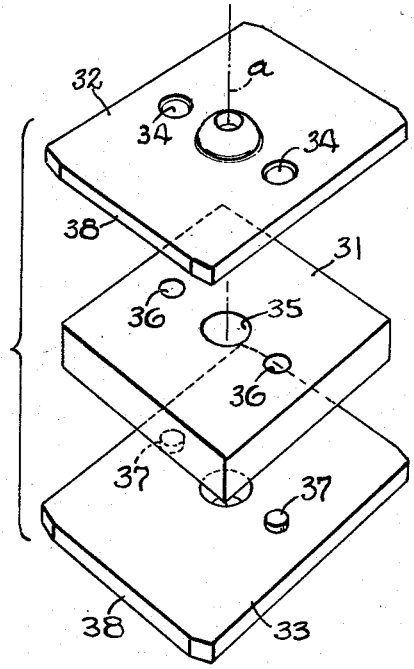
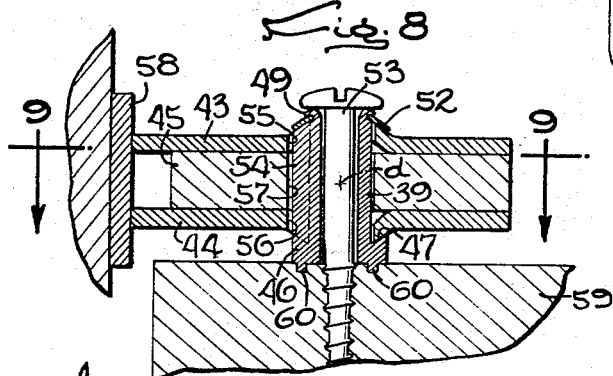
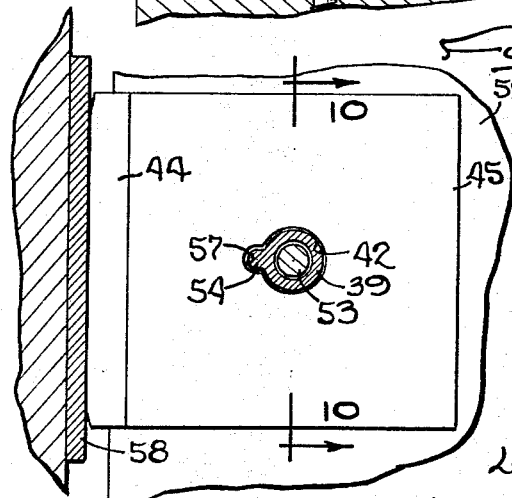
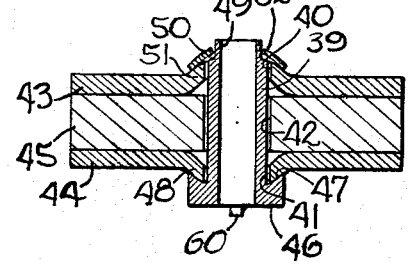
INVENTOR
Lloyd L. Anderson
by Wolfe, Hubbard, Voit & Osann
ATTORNEYS

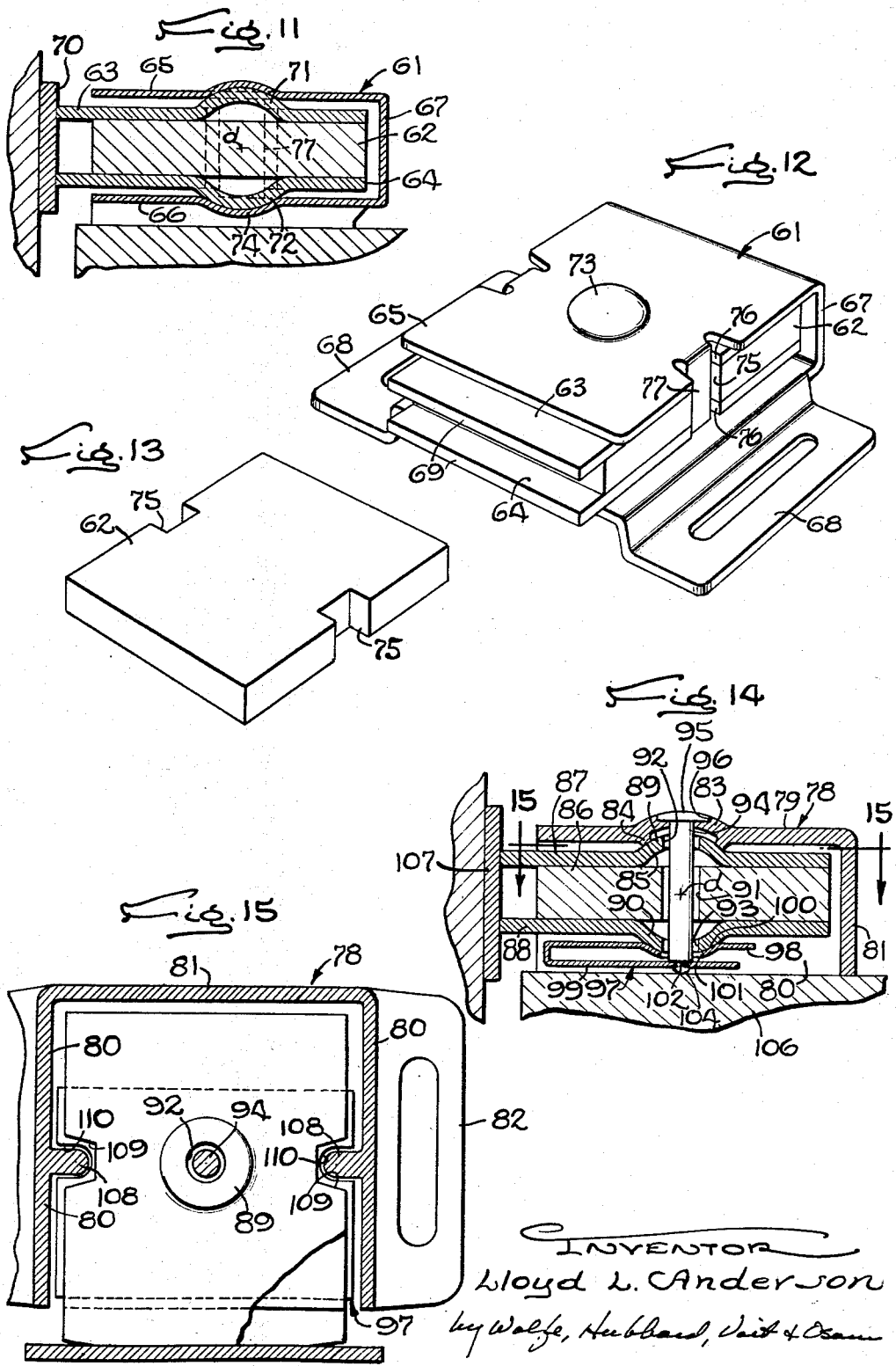

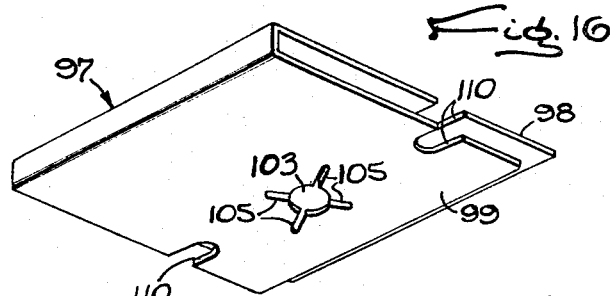
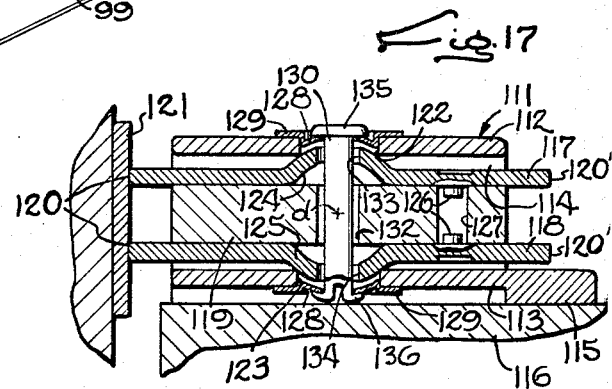
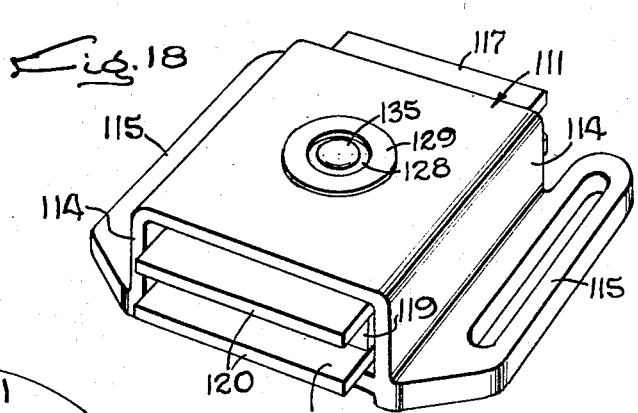
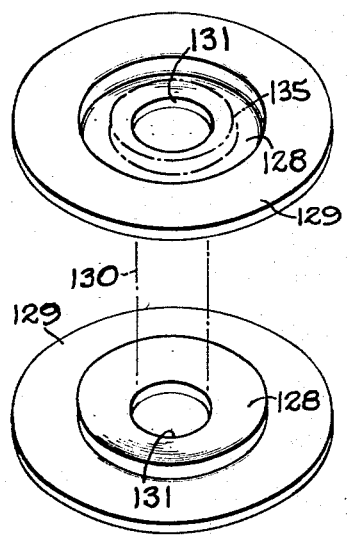

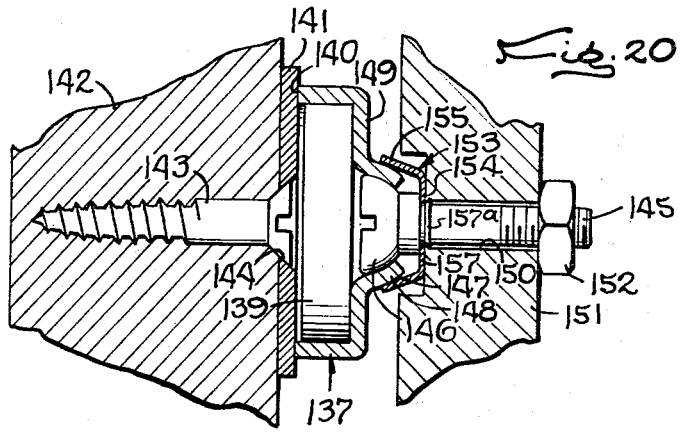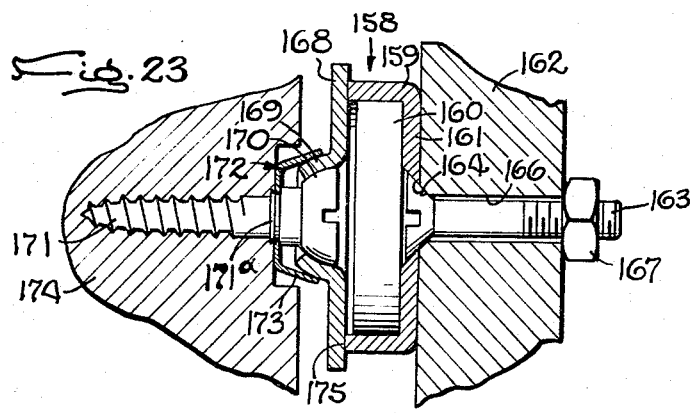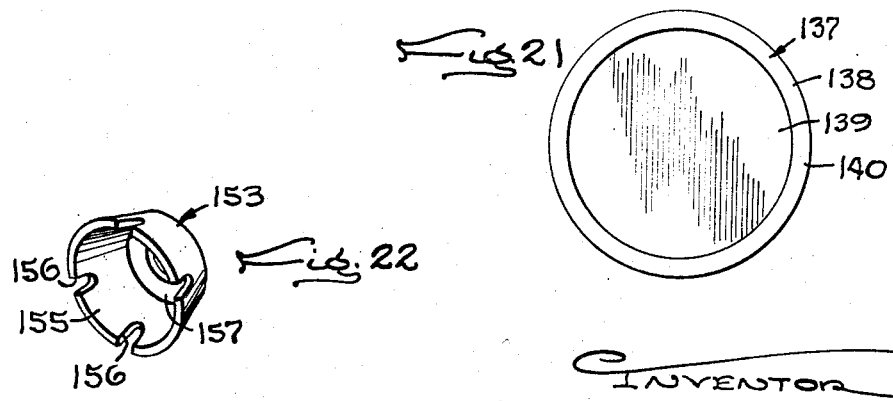

Nov. 22, 1966 L. L. ANDERSON 3,287,051
MAGNETIC CATCH
Filed Aug. 10, 1964 6 Sheets-Sheet 6
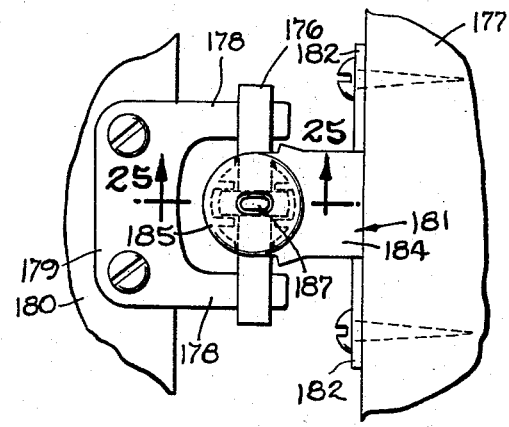
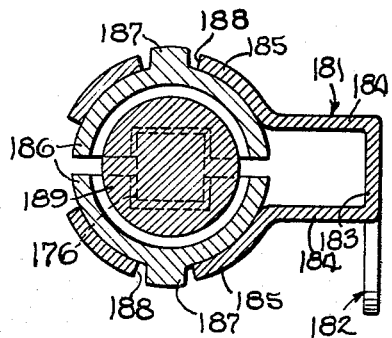
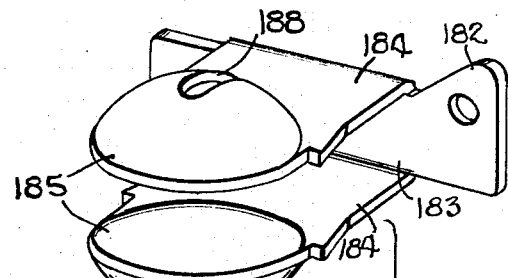
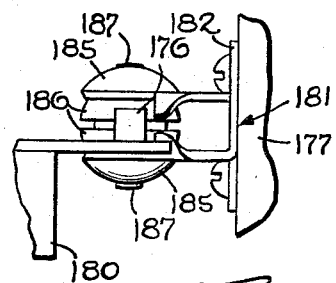
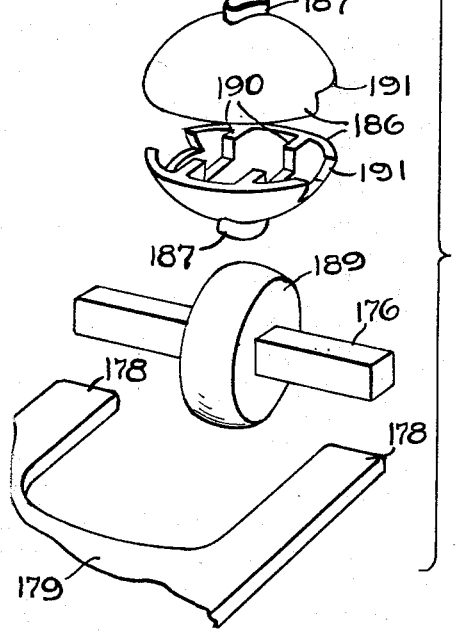
INVENTOR
Lloyd L. Anderson
by Wolfe, Hubbard, Voit & Osann
ATTORNEYS

United States Patent Office 3,287,051
Patented Nov. 22, 1966

3,287,051
MAGNETIC CATCH
Lloyd L. Anderson Rockford, Ill., assignor to Amerock Corporation, Rockford, Ill., a corporation of Illinois
Filed Aug. 10, 1964, Ser. No. 388,493
16 Claims. (Cl. 292—251.5)

This invention relates to a magnetic holding device such as a catch for holding the door of a cabinet closed, and, more particularly, to a catch which includes two units, one being a strike and the other being a permanent magnet unit is formed with a face which engages the strike whereby the strike completes the flux path for the magnet and the two units are held together magnetically.

The general object of the invention is to provide a new and improved magnetic holding device which produces a substantially uniform and optimum magnetic holding force.

A more detailed object is to mount one of the units for universal swiveling so that this unit may be turned in whatever direction may be necessary for full face engagement with the other unit thereby to minimize the possibility of an air gap between the units so that the full force of the magnet is utilized consistently in the use of the device.

Another object is to apply a restraining force to the adjustable unit so that the unit may be turned to the proper position by a mechanical force but it is not turned during normal usage by the magnetic force.

In some aspects of the invention, it is an object to arrange the parts so that the restraining force may be adjusted to a magnitude greater than the normal magnetic force produced by the device.

The invention also resides in the particular construction used to obtain the universal swiveling and to produce the restraining force.

Other objects and advantages of the invention will become apparent from the following detailed description taken in connection with the accompanying drawings, in which FIGURE 1 is a longitudinal sectional view of a magnetic catch embodying the novel features of the present invention.

FIG. 2 is an end view of the catch.

FIG. 3 is an exploded perspective view of the magnet and pole piece assembly.

FIG. 4 is a schematic side view of the magnet and pole piece assembly and shows the movement of the latter.

FIG. 5 is a schematic end view of the magnet and pole piece assembly and shows the movement of the latter.

FIG. 6 is a fragmentary plan view on a reduced scale of the catch as mounted on a typical cabinet.

FIG. 7 is an exploded perspective view of the magnet and pole piece assembly of a modified form of the invention.

FIG. 8 is a longitudinal sectional view of another modified form of the invention.

FIG. 9 is a sectional view taken along the line 9—9 in FIG. 8.

FIG. 10 is an enlarged fragmentary sectional view taken along the line 10—10 in FIG. 9 and shows the parts during assembly.

FIG. 11 is a longitudinal sectional view of still another form of catch construction according to the invention.

FIG. 12 is a perspective view of the catch shown in FIG. 11.

FIG. 13 is a perspective view of the permanent magnet used in the catch of FIG. 11.

FIG. 14 is a longitudinal sectional view of a further form of catch constructed according to the invention.

FIG. 15 is a fragmentary sectional view taken along the line 15—15 of FIG. 14.

FIG. 16 is a perspective view of a spring used in the catch of FIG. 14.

FIG. 17 is a longitudinal sectional view of a catch illustrating another form of the invention.

FIG. 18 is a perspective view of the catch shown in FIG. 17.

FIG. 19 is an enlarged perspective view of the spring assembly used in the catch of FIG. 17.

FIG. 20 is a longitudinal sectional view of another form of catch constructed according to the invention.

FIG. 21 is a front view of the magnet assembly used in the catch of FIG. 20.

FIG. 22 is a perspective view of a resilient washer used in the catch of FIG. 20.

FIG. 23 is a longitudinal sectional view of another form of the invention.

FIG. 24 is a top view of still another form of catch constructed according to the invention.

FIG. 25 is an enlarged fragmentary sectional view taken along the line 25—25 in FIG. 24.

FIG. 26 is a side view of the catch shown in FIG. 24.

FIG. 27 is an exploded perspective view of the catch of FIG. 24.

While the invention is applicable for holding various types of parts in a predetermined relationship, it is shown in the drawings for purposes of illustration as embodied in a magnetic catch employing a permanent magnet and adapted to hold a closure member in the closed position. A typical application of the catch is in connection with a cabinet where the permanent magnet unit 10 of the catch may, as shown in FIG. 1, be mounted on a part of the cabinet frame 11 such as on a shelf 12 and the strike 13 of the catch is mounted on the cabinet door 14. The magnet unit 10 may include a permanent magnet 15 with pole pieces 16 and 17 of magnetic material lying against the two poles of the magnet and projecting beyond the magnet to present pole faces 18 which are disposed substantially in a common plane to abut the strike 13. The latter, in the form illustrated in FIG. 1, is a flat plate of magnetic material fastened to the inside of the door 14 by a screw 19. Thus, the strike completes the flux path of the magnet whereby the path extends from the magnet through one pole piece 16 to the strike 13 and back to the magnet through the other pole piece 17. As a result, the strike is held against the pole faces 18 and hence the door 14 is retained in the closed position.

For a permanent magnet of given strength, the force with which the catch holds the door 14 closed depends upon whether or not the pole faces of the magnet unit 10 are in full face engagement with the strike 13. Anything less than full face engagement introduces an air gap in the flux path and reduces the force. Accordingly, the present invention contemplates a novel construction in which one of the catch units, the strike or the magnet unit, is mounted to turn at least about two perpendicular axes which parallel the plane of the pole faces so that the two units may be adjusted relative to each other to positions in which the pole faces do, in fact, engage the strike full face. Moreover, the arrangement is such that the adjustment of the parts to the proper position may be achieved automatically as an incident to the initial use of the catch and, thereafter, the parts are held in the adjusted position during the subsequent use of the catch.

To achieve the foregoing, means is provided to mount one of the catch units so that this unit may be swiveled, and this means also exerts a restraining force to hold the unit against turning except upon the application of a reasonably substantial mechanical force. The parts are arranged so that the restraining force exceeds the force exerted by the magnet as the catch and strike units are moved together and apart whereby the magnetic force does not change the position of the adjustable unit. The restraining force is small enough, however, to permit turning of the adjustable unit under the mechanical force resulting from the physical engagement of the catch and the strike in the usual use of the device. Thus, upon each successive engagement of the units, the adjustable unit is turned slightly until it reaches the position in which there is full face engagement between the catch and the strike. Thereafter, the restraining force holds the adjustable unit in this position. The means for supporting the adjustable unit may be arranged to permit selective adjustment of the magnitude of the restraining force or the force may be preset in the manufacture of the unit but, in either case, this force preferably is exerted frictionally.

The embodiment illustrated in FIGS. 1 through 6 demonstrates the application of the invention to a catch for a cabinet door 14 in one of its more simple forms. In this case, the permanent magnet 15 is a flat, square block and is of the type in which the magnetic poles are disposed at the broad surfaces of the magnet, that is, at the top and bottom of the magnet as viewed in FIG. 1. The pole pieces 16 and 17 are flat plates overlying the broad surfaces of the magnet and, in one direction, overhang the edge of the magnet to provide the pole faces 18.

The means for supporting the pole pieces 16 and 17 and the magnet 15, which herein comprise the magnet unit 10 and together are the adjustable unit of the catch, includes a cup-shaped washer 20 which receives an outwardly projecting, convex spherical part or boss 21 on the lower pole piece 17. Thus, this pole piece and hence the entire magnet unit may swivel in all directions on the cup. To mount the magnet unit 10 on the shelf 12, a screw 22 projects through a hole 23 in the upper pole piece 16, a center hole 24 in the magnet and a hole 25 which is in the lower pole piece 17 and is concentric with the boss 21, the lower end of the screw projecting through a hole 26 in the washer 20 and being threaded into the shelf 12. To accommodate the swiveling of the magnet unit in the washer 20, the upper pole piece 16 is formed with an upwardly extending spherical boss 27 similar to the boss 21 and this boss is engaged by a downturned peripheral flange 28 on the underside of the head 29 of the screw 22. The bosses 21 and 27 have a common center $d$ (FIG. 1) which is located at the intersection of the axes $a$ and $b$ (FIGS. 4 and 5) and, in this instance, the magnet also can turn about the third intersecting axis $c$.

With the foregoing arrangement, the pole pieces 16 and 17 and the magnet 15 may turn about the vertical axis $a$ (FIG. 4) of the screw 22 and they also may turn about any horizontal axis extending through the center of the magnet to the extent permitted by the clearance between the shank of the screw and the walls of the holes 23, 24 and 25, that is, the unit may turn about the transverse axis $b$ (FIG. 5) as well as the fore and aft axis $c$ (FIG. 4). In the form shown in FIGS. 1 through 6, the turning about the vertical axis may be limited by mounting the catch near a wall 30 of the cabinet (see FIG. 6) so that the magnet unit 10 engages the wall after it has turned through a predetermined angle as shown in broken lines. The amount that the unit can turn in any direction, however, is sufficient to allow the faces 18 of the pole pieces 16 and 17 to be oriented for full face engagement with the strike.

The washer 20 is resilient so as to exert a frictional force on the boss 21. The magnitude of this force is sufficient to restrain the magnet unit 10 against any turning which might result from the force of the magnet as the strike 13 is moved into and out of engagement with the pole faces 18. The restraining force, however, is small enough to permit movement of the magnet unit upon the application of a mechanical force on the order of that which might normally be exerted by the usual closing of the door 14.

In order to set the restraining force at a magnitude which meets these requirements, the means for supporting the magnet unit 10 is adjustable and, in the form shown in FIGS. 1 through 6, the mounting screw 22 is used to vary the degree of deformation of the resilient cup 20 and hence the magnitude of the frictional force exerted on the boss 21 by the cup. Thus, as the screw is threaded further into the shelf 12, the magnet unit is drawn more tightly down into the cup which expands progressively and produces an increasing frictional force. Such advancing of the screw is continued until the desired frictional force is obtained.

With the foregoing arrangement, the pole pieces 16 and 17 are placed on opposite sides of the magnet 15 and the cup-shaped washer 20 is seated on the boss 21. The screw 22 is projected through the holes 23, 24, 25 and 26 in the pole pieces, the magnet and the washer with the flange 28 on the head 29 of the screw seated on the boss 27. The magnet unit 10 then is located on the shelf 12 adjacent the front edge of the latter with the pole faces facing outwardly toward the strike 13 and is spaced a short distance from the wall 30 of the cabinet. Finally, the screw is threaded into the shelf until the boss 21 is sufficiently tight in the washer 20 so that the magnet unit can be turned in the washer only by the application of a manual force of reasonably substantial magnitude.

As thus mounted, it is quite unlikely that the pole faces 18 will be disposed for full face engagement with the strike 13, even if a great deal of care has been taken in the mounting. The magnet unit 10 is adjusted for such engagement, however, automatically as an incident to the initial period of service use of the catch. Thus, when the door 14 is closed, the strike exerts a mechanical force on the magnet unit and this swivels the latter about the center $d$ as may be required to move the unit toward the position in which the pole faces fully engage the strike. When the door is opened, the magnet unit does not move because it is restrained by the frictional force of the washer 20. Thus, the magnet unit is turned progressively toward the proper position and, upon reaching this position, it remains stationary during further normal use of the cabinet.

The arrangement shown in FIG. 7 is generally the same as the one illustrated in FIGS. 1 through 6 except that an additional means is provided to maintain the general orientation of the magnet 31 relative to the pole pieces 32 and 33 so that the magnet turns generally in unison with the pole pieces about the axis $a$. Herein, this means comprises lugs rigid with the pole pieces and projecting into holes in the magnet. Thus, lugs 34 are struck down from the pole piece 32 on opposite sides of the hole 35 and project into similarly located holes 36 in the magnet 31 while lugs 37 struck up from the pole piece 33 project into the same holes from the opposite side. The lugs 34 and 37 are substantially smaller than the holes 36 to provide clearance sufficient to permit independent turning of the pole pieces as may be required for flush engagement of the pole faces 38 with the strike. At the same time, the lugs cause the magnet to turn with the pole pieces when the latter turn through comparatively large angles and this maintains the general relative positions of the three parts.

Instead of placing the resilient washer at the bottom of the magnet unit, it may be located at the top under the head of the mounting screw as illustrated in FIGS. 8, 9 and 10. In this case, the magnet unit includes a hollow cylinder 39 which projects through central holes 40, 41 and 42 in the pole pieces 43 and 44 and the magnet 45. At its lower end, the cylinder is enlarged as indicated at 46 and formed on the upper side of this enlargement is an annular seat 47 which is concave and spherical in shape to receive the boss 48 on the lower pole piece 44. As originally formed, the cylinder is reduced at its upper end to provide an axial flange 49 and a shoulder 50 which is spaced slightly above the boss 51 on the upper pole piece 43 as shown in FIG. 10.

In assembling the magnet unit, the pole pieces 43 and 44 and the magnet 45 are placed on the cylinder 39 and then the resilient washer 52 is located on the flange 49. In its relaxed condition, the outer periphery of the washer rests on the boss 51 while the inner periphery is spaced a short distance above the shoulder 50. With the parts in this position, the flange 49 is curled outwardly and downwardly over the washer 52 which is flexed until its inner periphery seats against the shoulder 50. As shown in FIG. 8, this locks the parts of the magnet unit together independently of the mounting screw 53 while, at the same time, the bosses 48 and 51 may turn in the seat 47 and the washer 52 to the extent permitted by the clearance of the cylinder 39 in the holes 40, 41 and 42. Also, this manner of assembly presets the magnitude of the frictional force exerted by the washer 52. Thus, the curling down of the flange 49 progressively stresses the washer until it abuts the shoulder 50 whereby the position of the shoulder determines the amount of stressing and hence the magnitude of the frictional or restraining force and this force is not changed by the screw 53 in mounting the magnet unit.

The relative position of the pole pieces 43 and 44 and the magnet 45 is, in this instance, maintained by a key 54 (FIGS. 8 and 9) which extends longitudinally along the side of the cylinder 39 from the enlargement 46 to the shoulder 50 and is disposed in key slots 55, 56 and 57 in the pole pieces and the magnet. As in the case of the holes 40, 41 and 42, the slots 55, 56 and 57 provide sufficient clearance around the key 54 to permit turning of the pole pieces and magnet about the center $d$ for alinement with the strike 58.

To mount the magnet unit, the screw 53 is inserted into the bore of the cylinder 39 and, with the unit properly positioned relative to the shelf 59, the screw is threaded into the shelf. Projecting downwardly from the underside of the cylinder are prongs 60 which are sunk into the shelf as the screw is tightened down and hold the cylinder against turning on the shelf. With this arrangement, the key 54 serves the additional purpose of limiting lateral turning of the magnet unit and, as a result, the latter need not be mounted near a cabinet wall as is the case with the form shown in FIGS. 1 through 6.

Means other than a resilient washer may be utilized to obtain the frictional restraining force. For example, the magnet unit may be provided with a casing 61 which is made of resilient material and which frictionally restrains the turning of the pole pieces and magnet in all directions. Such an arrangement is illustrated in FIGS. 11 through 13 in which the magnet 62 and pole pieces 63 and 64 are enclosed in a one-piece casing 61 which is made of a material that is both nonmagnetic and resilient. The body of the casing is U-shaped to form top and bottom walls 65 and 66 joined by a back wall 67 with the conventional mounting wings 68 projecting laterally from the sides of the bottom wall.

The magnet 62 and the pole pieces 63 and 64 are sandwiched between the upper and lower walls 65 and 66 of the casing 61 with the front ends of the pole pieces projecting beyond the walls to present the pole faces 69 to the strike 70. Universal swiveling of the magnet and pole pieces is achieved by seating the bosses 71 and 72 of the pole pieces in complementary spherical depressions 73 and 74 formed in the upper and lower casing walls. The depth of the depressions is less than the height of the bosses so that the pole pieces are spaced from the walls 65 and 66 as shown in FIG. 11 and the depressions are located so as to space the ends of the magnet and the pole pieces from the back wall 67 of the casing. This spacing provides clearances which permit limited swiveling of the magnet and pole pieces about the center $d$. At the center on both sides, the magnet and pole pieces are formed with notches 75 and 76 respectively and these notches loosely receive lugs 77 bent down from the upper wall 65 of the casing to hold the magnet and pole pieces in the casing while permitting these parts to swivel in the casing and, to some extent, to turn relative to each other.

In the normal or relaxed condition of the casing 61, the upper wall 65 is inclined toward the lower wall 66 so that the two walls are closer together at the front of the casing than at the rear. The walls then are sprung apart to insert the magnet 62 and the pole pieces 63 and 64 which, when in place, hold the walls in the generally parallel position shown in FIG. 11. When the parts are finally assembled, the casing is stressed and, since it is made of resilient material, the walls 65 and 66 are urged together and thereby exert a force on the bosses 71 and 72. This produces the frictional restraining force the magnitude of which depends upon the stressing required to move the upper wall 65 from the relaxed position to the assembled position.

Alternatively, the casing may be rigid and an independent spring used to apply the restraining force as is the case in the embodiment illustrated in FIGS. 14 through 16. In such an arrangement, the casing 78 may be open at the bottom and composed of top, side and rear walls 79, 80 and 81 with the walls being comparatively thick in cross section and with the mounting wings 82 projecting laterally from the lower edges of the side walls 80. The top wall 79 is formed with a spherical raised portion 83 from which depends a circular rib 84 to provide an annular seat 85. The permanent magnet 86 and the pole pieces 87 and 88 are generally similar to the form shown in FIG. 10 except that the magnet and the spherical bosses 89 and 90 on the pole pieces are provided with centrally located holes 91, 92 and 93 to receive loosely a stud 94 whose head 95 is seated in a recess 96 in the top of the raised portion 83.

To apply the restraining force, a spring 97 acts between the lower end of the stud 94 and the underside of the lower pole piece 88 to hold the magnet 86 and the pole pieces 87 and 88 together and to urge the boss 89 on the upper pole piece against the seat 85. In the present instance, the spring 97 is made from resilient sheet metal and is bent into a U-shape as shown in FIGS. 14 and 16. The spring is disposed beneath the lower pole piece with its legs 98 and 99 generally parallel to the upper wall 79 of the casing 78. The upper leg 98 of the spring adjacent its free end is formed with an upwardly facing spherical depression 100 which receives the boss 90 on the lower pole piece, there being a hole 101 in the center of the depression through which the stud 94 may pass. At its lower end, the stud is reduced in diameter as indicated at 102 to pass through a hole 103 (FIG. 16) in the lower leg 99 of the spring and the extreme end of the stud is formed with a head 104 to hold the lower spring leg up and stress the spring. The head 104 may be preformed in which case short slots 105 (FIG. 16) radiate from the hole 103 to permit the head to be pushed through the hole during assembly.

With this arrangement, the magnet and pole piece assembly is spaced from all the walls of the casing 78 as well as from the shelf 106 on which the casing is mounted and thus the assembly may swivel in the seat 85 and the depression 100 in the spring about the center $d$ to aline the pole faces with the strike 107. The amount of this swiveling is limited by the clearance of the stud 94 in the holes 91, 92, 93 and 101 and by internal vertical ribs 108 (FIG. 15) which are integral with the side walls 80 of the casing and project loosely into notches 109 formed in the sides of the magnet and the pole pieces and notches 110 in the spring. The latter applies a frictional force which restrains the swiveling and the magnitude of this force depends upon the stressing of the spring which, in turn, is determined by the position of the lower head 104 on the stud 94.

If desired, the frictional restraining force may be applied through a combination of a spring and a resilient casing as shown in FIGS. 17 through 19. In this case, the casing 111 may be molded from a resilient material, such as any one of the well-known suitable plastics, and is formed with top, bottom and side walls 112, 113 and 114 and mounting wings 115 disposed at a level lower than the bottom wall 113 so as to raise the latter off the shelf 116. The casing is open at both ends and the pole pieces 117 and 118 project beyond both ends of the permanent magnet 119 and through both open ends of the casing to present two pairs of pole faces 120 and 120′ either of which may coact with the strike 121, depending upon the most desirable manner of mounting the casing.

The top and bottom walls 112 and 113 are formed with centrally located circular openings 122 and 123 and the spherical bosses 124 and 125 on the pole pieces 117 and 118 project into these openings to bear on the inner sides of the walls around the openings. This supports the magnet 119 and the pole pieces 117 and 118 in the casing 111 for universal swiveling about the center $d$. Ears 126 struck out of the pole pieces project loosely into the opposite ends of an off-center hole 127 in the magnet to limit relative movement of the magnet and the pole pieces.

Herein, two springs are employed and each takes the form of a resilient metal ring 128 disposed within and formed integrally with an annular washer 129. One spring washer unit is associated with each of the openings 122 and 123 in the top and bottom walls 112 and 113 and the washer 129 is sized to overlie the associated wall around the opening with the resilient ring 128 projecting into the opening as shown in FIG. 17. A stud 130 projects through the central holes 131 (FIG. 19) in the rings 128 and also loosely through holes 132, 133 and 134 in the magnet 119 and the pole pieces 117 and 118. A performed head 135 is provided at the upper end of the stud 130 while a second head 136 is formed on the lower end of the stud after the parts are assembled.

The rings 128 are bowed outwardly and the heads 135 and 136 abut these rings. Thus, by the formation of the head 136, the stud selectively stresses the rings 128 which, through the washers 129, exert an inwardly directed force on the casing walls 112 and 113. Since the casing 111 is resilient, this force is transmitted by the walls to the bosses 124 and 125 to produce a frictional force which restrains the swiveling of the magnet 119 and the pole pieces 117 and 118. It will be seen that the stressing of the rings 128 and hence the magnitude of the frictional force may be set at a desired value by selecting the amount which the head 136 is upset.

A somewhat different form of the invention is shown in FIGS. 20 through 22 in which the magnet unit 137 is cylindrical and includes a cylindrical cup 138 of magnetic material and a round permanent magnet 139 disposed within the cup. The magnet is cemented in the cup and substantially fills the latter except that the outer face of the magnet is disposed behind the outer end 140 of the cup. This cup end provides an annular pole face which engages a circular disc 141 of magnetic material, the latter serving as the strike of the catch and being mounted on the cabinet door 142 by a screw 143 which projects through a central hole 144 in the disc. The poles of the magnet 139 are at the broad faces so that, as shown by the broken lines in FIG. 20, the flux of the magnet threads a toroidal path from the outer face of the magnet to the disc 141 and through the cup 138 to the inner face of the magnet.

To mount the magnet unit 137 for universal swiveling, the latter is supported by a machine screw 145 whose head 146 is formed on the back side with a spherical surface 147. This surface is seated in a complementally shaped boss 148 integral with the back side or bottom 149 of the cup 138. The screw 145 projects through a hole 150 in a wall 151 of the cabinet frame and is secured by a nut 152 threaded on the screw. Thus, the magnet unit may be turned to the position where the face 140 fully engages the strike 141.

The restraining force is produced by a resilient cup-shaped washer 153 encircling the screw 145 and abutting against a shoulder 154 on the screw behind the head 146. The skirt 155 of the washer projects forwardly to engage and surround the outside of the boss 148 and this skirt is resiliently expandable, notches 156 (FIG. 22) being provided in the outer edge of the skirt to improve this action. As indicated at 157ᵃ, the shank of the screw is upset against the back side 157 of the washer which thereby is expanded against the boss 148. The amount of such expansion is limited by the shoulder 154 which thus determines the magnitude of the force which the washer exerts on the boss 148. This is a frictional force and restrains the swiveling of the magnet unit 137.

Instead of swiveling the magnet unit, it may be mounted rigidly and the strike may be supported for universal swiveling as illustrated in FIG. 23. Here, as in the form shown in FIG. 20, the magnet unit 158 includes a cylindrical cup 159 which receives a permanent magnet 160. In this case, however, the back wall 161 of the cup is flat to lie against the cabinet wall 162 and the cup is secured rigidly in this position by a screw 163 projecting through a hole 164 in the cup wall 161 and a hole 166 in the cabinet wall and by a nut 167 threaded on the screw.

In order to support the strike 168 for swiveling, the central portion of the strike is depressed to form a spherical boss 169 and seated in this boss is the head 170 of a wood screw 171, the back of the head being spherical to mate with the inner surface of the boss and support the strike for swiveling. A resilient cup-shaped washer 172, like the washer 153, encircles the shank of the screw 171 and the skirt 173 of the washer engages the back of the boss 169. The screw 171 is threaded into the door 174 with the back of the washer 172 abutting the door. As in FIG. 20, the washer is expanded against the boss by upsetting the screw shank at 171ᵃ and this expansion produces a friction force between the washer and the boss 169 to restrain the swiveling of the strike. Thus, the strike may be turned mechanically to the position in which it fully engages the face 175 of the magnet unit 158 and then retains this position during service use.

An embodiment of the invention in which a bar magnet is used is illustrated in FIGS. 24 through 27. In this case, a bar magnet 176 is supported on the cabinet frame 177 to span the legs 178 of a flat, U-shaped strike 179 which is fixed to the cabinet door 180. A bracket 181 supports the magnet on the frame so that the magnet may swivel to that position in which one side of the magnet will lie flat against the legs 178 of the strike 179 when the door is closed. To accomplish this, the bracket 181 is U-shaped with mounting wings 182 projecting laterally from the sides of the base 183 and generally parallel legs 184 projecting forwardly from the base. The outer end portions 185 of the legs are given a spherical shape to provide spherical seats each of which receives a hollow, generally hemispherical part 186. The latter are free to swivel in the seats within the limits determined by elongated lugs 187 which are integral with the parts 186 and project into similarly shaped but larger holes 188 in the seats 185.

Rigid with the magnet 176 is a cylinder 189 disposed midway between the ends of the magnet and received between spaced webs 190 (FIGS. 24 and 27) formed on the insides of the hemispherical parts 186. The ends of the magnet project through notches 191 in these parts and the notches are sized so that the parts frictionally grip the magnet whereby the magnet 176 and the parts 186 turn together in the seats 185. In this way, the parts 186 and the cylinder 189 form a ball supporting the magnet and turning in the seats 185. The bracket 181 is made of resilient material and the normal spacing of the legs 184 before assembly is somewhat less than that after the parts 186 and the magnet 176 are inserted in place. Thus, the legs, after assembly, are slightly sprung apart and bear resiliently on the parts 186. This produces a frictional restraining force which permits the magnet to be turned to the proper attitude but holds the magnet against further turning during service use.

It will be seen that a catch constructed in accordance with the invention can, after it is mounted, be adjusted in any direction that may be necessary to aline the magnet unit and the strike for full face engagement. Moreover, this adjustment may be accomplished by the mechanical force produced by the usual closing of the door so that the adjustment is made automatically as an incident to the initial use of the catch. Thereafter, the frictional restraining force prevents further relative turning of the parts during service use so that parts remain in the proper position for optimum magnetic performance.

I claim as my invention:

1. In a device for selectively holding first and second parts in a predetermined position relative to each other, the combination of a first member including a permanent magnet and a face disposed substantially in a single plane and facing outwardly, a second member composed of magnetic material and having a surface adapted for engagement with said face whereby the flux path of said magnet extends through said face to said surface, means for mounting said first member on one of said parts, means for mounting said second member on the other of said parts, one of said means including two spherical parts carried by the corresponding one of said members and extending outwardly in opposite directions, said spherical parts having a common center, two seats, one receiving each of said spherical parts, to support said one member for universal swiveling about said center, and means resiliently urging said spherical parts into said seats to produce a frictional force restraining such swiveling under normal separation of said first and second parts whereby a mechanical force adjusts the members for full face engagement of said face and said surface and said members thereafter retain their adjusted positions during service use of the device.

2. In a device for selectively holding first and second parts in a predetermined position relative to each other, the combination of a first member including a permanent magnet and a face disposed substantially in a single plane and facing outwardly, a second member composed of magnetic material and having a surface adapted for engagement with said face whereby the flux path of said magnet extends through said face to said surface, means for mounting said first member on one of said parts, means for mounting said second member on the other of said parts, one of said means including a spherical part carried by the corresponding one of said members, a cup-shaped element made of resilient material and having an annular skirt receiving and engaging said spherical part thereby to support said one member for universal swiveling, and means for urging said spherical part into said element to expand said skirt, said skirt exerting a frictional force on said spherical part to restrain swiveling of said one member under normal separation of said first and second parts whereby a mechanical force incident to engagement of said members adjusts the members for full face engagement of said face and said surface and said members thereafter retain their adjusted positions during service use of the device.

3. In a catch for holding a closure element to a frame, the combination of, a permanent magnet of generally rectangular cross section, two generally flat pole pieces of magnetic material lying against opposite poles of said magnet and presenting pole faces disposed in a substantially common plane for engagement with a strike, two outwardly extending spherical bosses, one formed on each of said pole pieces, said bosses having a common center disposed between the poles of said magnet, two seats, one receiving each of said bosses thereby to support said magnet and said pole pieces for universal swiveling to present said pole faces to the strike, and means resiliently urging said bosses against said seats thereby to exert a frictional force restraining the swiveling of the magnet and the pole pieces.

4. In a catch, the combination of, a permanent magnet having generally flat, parallel surfaces at the poles thereof, two generally flat plates of magnetic material lying against said surfaces and constituting pole pieces for said magnet, said magnet and said plates having alined holes in the central portions thereof, a first convex spherical boss formed on the outside of one of said plates around the hole therein, a second and similar boss formed on the other of said plates, said bosses having a common center, a resilient element having an annular skirt receiving said first boss, an elongated fastening member projecting loosely through said holes and adapted to secure said magnet and said plates to a support with said resilient element abutting the support, and a head on said fastening member and having an annular flange engaging said second boss whereby said magnet and said plates may swivel about said center on said skirt and said flange, said element producing a frictional force between said skirt and said first boss and between said flange and said second boss to restrain such swiveling.

5. In a device for selectively holding first and second parts in a predetermined position relative to each other, the combination of, a first member including a permanent magnet and a face disposed substantially in a single plane and facing outwardly, a second member composed of magnetic material and having a surface adapted for engagement with said face whereby the flux path of said magnet extends through said fact to said surface, first means for mounting said first member on one of said parts, second means for mounting said second member on the other of said parts, one of said mounting means including an element rigid with the corresponding member and a seat assembly receiving and engaging said element to permit movement of said corresponding member about at least two perpendicular axes which parallel said face, at least a portion of said seat assembly being resilient and permanently stressed to exert a frictional force on said element thereby to restrain movement of said corresponding member under normal separation of said first and second parts whereby a mechanical force adjusts the two members for full face engagement of said surface and said face and said members thereafter retain their adjusted positions during service use of said device, and means independent of said resilient portion for rigidly attaching said one mounting means to the corresponding one of said parts.

6. A device as defined in claim 5 in which said element is rigid with said first part, said seat assembly includes a rigid support defining a seat to receive said element and a permanently stressed resilient member acting on said first part to urge said element into said seat and produce said frictional force, and said means for attaching said one mounting means is a portion of said rigid support.

7. A device as defined in claim 5 in which said element is a spherically shaped boss on one side of said first part, said seat assembly includes a tubular support projecting loosely through said first part and the center of said boss and a flange on said support defining a spherical seat receiving and engaging said element, said seat assembly further including a resilient washer bearing on the opposite side of said first part and a portion of said support acting on said washer to stress the washer permanently thereby to urge said element against said seat and produce said frictional force, and said means for attaching said one mounting means includes an end portion of said support and an elongated fastener projecting through the support.

8. A device as defined in claim 5 in which said element is rigid with said first part, said seat assembly includes a housing of generally U-shaped cross section enclosing said first part and having a portion receiving and engaging said element, and said means for attaching said one mounting means includes a flange on said housing.

9. A device as defined in claim 8 in which said housing is made of resilient material and is permanently stressed to urge the housing against said element to produce said frictional force.

10. A device as defined in claim 8 in which said seat assembly includes a spring member separate from said housing and acting between said housing and said element to urge the element against the housing and produce said frictional force.

11. In a device for selectively holding first and second parts in a predetermined position relative to each other, the combination of, a first member including a permanent magnet and a face disposed substantially in a single plane and facing outwardly, a second member composed of magnetic material and having a surface adapted for engagement with said face whereby the flux path of said magnet extends through said face to said surface, first means for mounting said first member on one of said parts, second means for mounting said second member on the other of said parts, one of said mounting means including an element rigid with the corresponding member and a seat assembly receiving and engaging said element to permit movement of said corresponding member about at least two perpendicular axes which parallel said face, at least a portion of said seat assembly being resilient, a connection between said element and said seat assembly and operable to stress said resilient portion permanently and exert a frictional force on said element to restrain movement of said corresponding member under normal separation and said first and second parts whereby a mechanical force adjusts the two members for full face engagement of said surface and said face and said members thereafter retain their adjusted positions during service use of the device, and means independent of said resilient portion for rigidly attaching said one mounting means to the corresponding one of said parts.

12. In a device for selectively holding first and second parts in a predetermined position relative to each other, the combination of, a first member including a permanent magnet and a face disposed substantially in a single plane and facing outwardly, a second member composed of magnetic material and having a surface adapted for engagement with said face whereby the flux path of said magnet extends through said face to said surface, first means for mounting said first member on one of said parts, second means for mounting said second member on the other of said parts, said first mounting means including a first element rigid with the first member and a first seat assembly receiving and engaging said element to permit movement of said first member about at least two perpendicular axes which parallel said face, said first mounting means also including a second element rigid with said first member and spaced from said first element and a second seat assembly receiving and engaging said second element also to permit movement of said first member about said same two axes, at least a portion of one of said seat assemblies being resilient and permanently stressed to exert a frictional force on both of said elements thereby to restrain movement of said first member under normal separation of said first and second parts whereby a mechanical force adjusts the two members for full face engagement of said surface and said face and said members thereafter retain their adjusted positions during service use of said device, and means independent of said resilient portion for rigidly attaching said first mounting means to said first part.

13. A device as defined in claim 12 in which said two seat assemblies are formed at least in part by a single U-shaped housing enclosing said first part and receiving and engaging both of said elements.

14. A device as defined in claim 13 in which said housing is made of resilient material and is permanently stressed to bear against said elements and produce said frictional force.

15. A device as defined in claim 13 in which said seat assemblies include at least one spring acting between said first part and said housing to urge said housing against said elements and produce said frictional force.

16. A device as defined by claim 12 in which said first seat assembly is a housing enclosing said first part and engaging said first element and said second seat assembly is a spring bearing on said second element and urging said first element against said housing to produce said frictional force.

References Cited by the Examiner
UNITED STATES PATENTS

| | | | |
|---|---|---|---|
| 2,514,927 | 7/1950 | Bernhard | 292—251.5 |
| 2,906,553 | 9/1959 | Wilson | 292—251.5 |
| 2,990,210 | 6/1961 | Fremstad | 292—251.5 |
| 3,078,114 | 2/1963 | Ahlgren | 292—251.5 |
| 3,163,453 | 12/1964 | Stephens | 292—251.5 |
| 3,186,748 | 6/1965 | Foltz | 292—251.5 |

FOREIGN PATENTS 822,541  10/1959  Great Britain.

BOBBY R. GAY, *Primary Examiner.*

RICHARD E. MOORE, *Examiner.*